United States Patent [19]

Smith

[11] 4,276,177

[45] Jun. 30, 1981

[54] HIGH EFFICIENCY FILTRATION WITH IMPURITY CONCENTRATION AND ULTRAFILTRATION REJECTION FLOW RECIRCULATION

[75] Inventor: Verity C. Smith, Dedham, Mass.

[73] Assignee: Vaponics Inc., Plymouth, Mass.

[21] Appl. No.: 66,049

[22] Filed: Aug. 13, 1979

[51] Int. Cl.³ .................... B01D 13/00; B01D 15/04; B01J 4/04
[52] U.S. Cl. .................... 210/638; 210/650; 210/669; 210/681; 210/683; 210/195.2; 210/259
[58] Field of Search .............. 210/23 R, 23 F, 27, 210/37 R, 34, 194, 195.1, 195.2, 259, 266, 23 H, 638, 650, 663, 669, 679, 683, 692, 694

[56] References Cited

U.S. PATENT DOCUMENTS

| 3,118,833 | 1/1964 | Reinhardt | 210/259 X |
|---|---|---|---|
| 3,408,289 | 10/1968 | Gustafson | 210/27 |
| 3,444,079 | 5/1969 | Bowers | 210/37 R |
| 3,506,126 | 4/1970 | Serfass et al. | 210/259 X |
| 3,716,482 | 2/1973 | Corte et al. | 210/37 R |
| 3,839,206 | 10/1874 | Welch | 210/259 |
| 3,985,648 | 10/1976 | Casolo | 210/37 R X |
| 4,141,825 | 2/1874 | Conger | 210/23 H |

Primary Examiner—Ferris H. Lander
Attorney, Agent, or Firm—Kenway & Jenney

[57] ABSTRACT

The rejection flow from a water ultrafiltration system is passed through a filtration means for removal of bacteria, viri, pyrogens, and colloids, the effluent of which is reintroduced into the affluent presented to the ultrafiltration surface. Treatment of the refjection flow prior to ultrafiltration after removal of bacteria, viri, pyrogens, and colloids may include carbon filtration followed by ion exchange treatment.

6 Claims, 4 Drawing Figures

HIGH EFFICIENCY FILTRATION WITH IMPURITY CONCENTRATION AND ULTRAFILTRATION REJECTION FLOW RECIRCULATION

BACKGROUND OF THE INVENTION

There is an increasing need in the pharamaceutical, chemical and related industries for a source of highly purified water which is available in large quantities, yet low in cost. Ultrafiltration has proven to be effective in meeting the needs of these industries. Ultrafiltration has an advantage over other filtration systems in that ultrafilters do not directly trap excluded particles; hence, the filtration membrane does not rapidly lose permeability.

In operation, ultrafiltration is a process in which a pressurized solution is caused to flow across a membrane surface. The membrane is designed so that water and species smaller in size than the rejection dimensions of the membrane will pass through the membrane, while larger species will be rejected at the membrane surface and pass downstream to be eliminated in a rejection flow.

A problem encountered in the ultrafiltration of large volumes of water is the build-up of rejected species which do not traverse the membrane. Such rejected species, though not trapped within the membrane, accumulate upon the ultrafiltration membrane surface. This phenomenon is called concentration polarization. Within an ultrafiltration system there is an impressed pressure differential across the membrane. Water and other very small molecules pass through the ultrafiltration membrane. Solutes larger than the rejection size of the membrane travel to the membrane surface but do not traverse the membrane surface. At the ultrafiltration surface such species accumulate. These species are removed from the surface only by back diffusion into the bulk flow. Since the water flux of ultrafiltration membranes is high, the convective transport rate is initially much higher than the diffusive back transport rate. A concentration of solute therefore builds up at the membrane surface until the solutes precipitate and form a gel. The thickness of this gel layer will increase until its hydraulic resistance to water transport reduces the water flux to an equilibrium value. At equilibrium the convection transport equals the diffusive transport and ultrafiltration is inhibited. Once concentration polarization is in control, increasing the pressure of the stream will not increase the flux since the higher pressure will cause a thicker layer of gel and hence greater resistance.

Typically, in large volume water purification, to avoid the rapid build-up of flow-impeding film on the ultrafiltration membrane, only highly filtered water is used as the ultrafiltration affluent. To achieve this end, raw water is exposed sequentially to filtration through carbon columns, cation resin columns, and anion resin columns; and, recently the filtration art has included a filtration through a large-pore macroreticular anion exchange resin column. This last resin has the advantage of removing most of the bacteria, virus, pyrogen, and colloid contamination from the water prior to ultrafiltration.

The typical preultrafiltration steps thus described requires that the total flow of the system be presented to the large-pore macroreticular anion exchange resin. Such filtration requires a large amount of large-pore macroreticular anion exchange resin due to the flow volume and the relative lack of concentration of bacteria, viri, pyrogens, and colloids. Furthermore, the system described then discards as waste that portion of ultrafiltration flow which does not traverse the ultrafiltration membrane.

SUMMARY OF THE INVENTION

The present invention is a process for the ultrafiltering of water. This process combines a highly efficient use of large-pore microreticular anion exchange resins with recovery and recirculation of ultrafiltration rejection flow. The present process has the particular advantage of eliminating the prefiltration of the entire volume of water prior to ultrafiltration with large-pore macroreticular anion exchange resins, and using such resins only on the smaller volume rejection flow from the ultrafilter. This is enabled by utilizing the ultrafiltration membrane's property of "pass on" of rejected species (here the contaminants). The rejection flow bears more concentrated levels of contaminants than the ultrafiltration affluent and requires less resin filtration to effect suitable flow and suitable purity. This is a result of the reduced volume of water to be filtered and the increased contaminant concentration of this water. The advantages of the process are reservation of rejection flow and reduction of resin required for filtration without accelerating concentration polarization at the ultrafiltration membrane. Subsequent to passing the ultrafiltration rejection flow through the large-pore macroreticular anion exchange resin column, this effluent may be reintroduced directly into the ultrafiltration affluent free from bacteria, viri, pyrogens, and colloids or it may be treated by carbon filtration and ion exchange prior to being reintroduced into the ultrafilter.

Raw water is highly purified by sequential filtration through columns of carbon, cation exchange resins and anion exchange resins. Highly purified water, though bearing bacteria, viri, pyrogens and colloids not removed by carbon filtration, anion exchange resins and cation exchange resin is then caused to flow under pressure along an ultrafiltration membrane. The excluded bacteria, viri, pyrogens, and colloids are not immediately deposited as a film on the ultrafiltration membrane. These contaminants excluded by the ultrafiltration membrane are passed on into the rejection flow. The rejection flow has considerably less volume than the ultrafiltration affluent flow which has the effect of concentrating the contaminants it bears. As a concentrate, these contaminants may then be passed over a smaller volume and slower flowing column of large-pore macroreticular anion exchange resin which will remove much of the bacteria, viri, pyrogens, and colloids. Upon filtering out, these contaminants are prevented from becoming a film on the ultrafiltration membrane. An ultrafiltration membrane will function properly only as long as such film is prevented from forming.

In some instances it is desirable to recover a brine which is rich in bacteria. Thus, the rejection flow from the ultrafiltration system may be collected and used as a source of bacteria brine.

Thus, it is an object of this invention to provide a method to substantially reduce the level of bacteria, viri, pyrogens, and colloids that are available for accumulation on an ultrafiltration membrane.

It is a further object of this invention to provide a method of filtration that situates a large-pore macroreticular anion exchange resin column so that the minimum quantity of the operative resin is capable of removing substantial amounts of bacteria, viri, pyrogens, and colloids, rendering these contaminants unavailable for accumulation on the ultrafiltration membrane.

It is a further object of this invention to provide a method for the recapture of the rejection flow of an ultrafiltration process that substantially removes from such rejection flow, bacteria, viri, pyrogens, and colloids rendering said rejection flow suitable for reintroduction into the ultrafiltration affluent stream, without risk of accelerated build-up of film on the ultrafiltration membrane.

Yet another object of the invention is to provide a process for producing ultrafiltered water which also produces a bacteria rich brine as a by product.

DESCRIPTION OF THE PREFERRED EMBODIMENT

At the outset, the invention is described in its broadest terms with a more detailed description following. The present invention is a process for the ultrafiltration of water. The process seeks to combine the most efficient use of filtration materials and the most efficient use of the total flow of the system while protecting the ultrafiltration membrane from concentration polarization.

This process will be better understood by a comparison with a typical filtration system now known.

Figure 1:
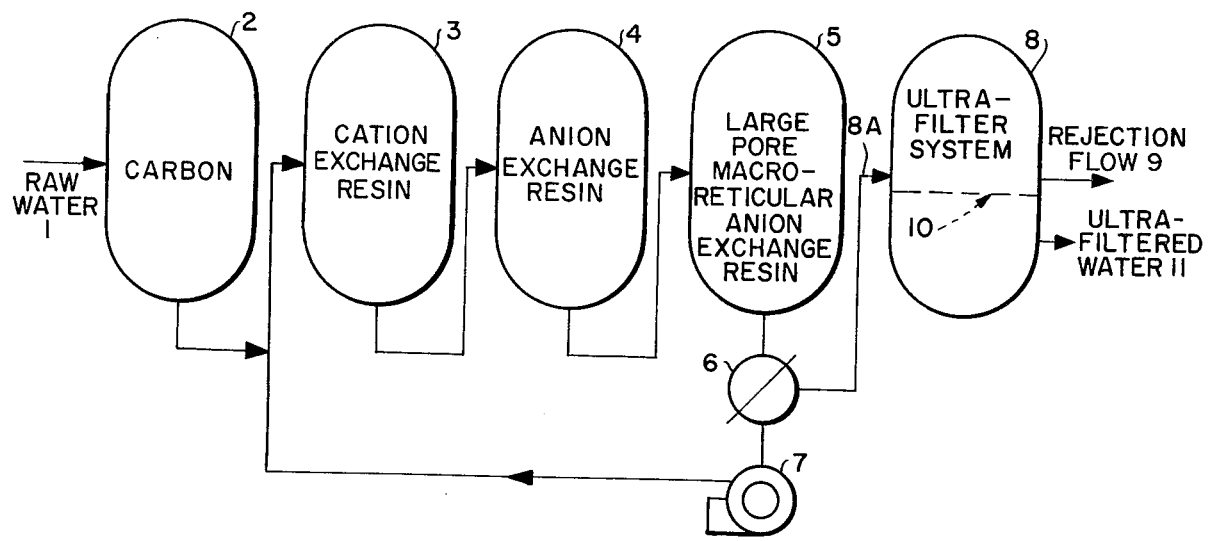
FIG. 1 shows a diagrammatic view of a typical prior art ultrafiltration process.

FIG. 1 is a typical ultrafiltration process well known to the art whereby raw water 1 containing organics, chlorine, cations, anions, bacteria, colloids, spores, and pyrogens is passed through a carbon filtration column 2 which removes organics and chlorine. The effluent from this filtration next is passed through a cation exchange resin 3 which removes cations. The effluent of the cation filtration column is next passed through an anion exchange column 4 which removes anions. At this stage the water is now highly purified yet it may still contain bacteria, colloids, viri, and pyrogens. The highly purified water is next passed through a column of large-pore macroreticular anion exchange resin 5 to remove bacteria, viri, pyrogens, and colloids. This column must be of suitable size and flow to accommodate the total flow of highly purified water that will be an affluent to the ultrafiltration system 8. Valve 6 and pump 7 permit effluent of the large-pore macroreticular anion exchange column to be recycled through cation exchange resin 3 and anion exchange resin 4 prior to ultrafiltration. Ultrafiltration is accomplished when highly filtered water 8A enters the ultrafilter system 8 under pressure. Ultrafiltered water 11 has traversed the ultrafiltration membrane 10. Water that did not pass through the ultrafilter, and any remaining contaminants form a rejection flow 9 which is discarded as waste.

The process of the present invention both retains and recirculates the rejection flow while eliminating the need for a large-pore macroreticular anion exchange resin column for the entire volume of water entering ultrafiltration.

Figure 2:
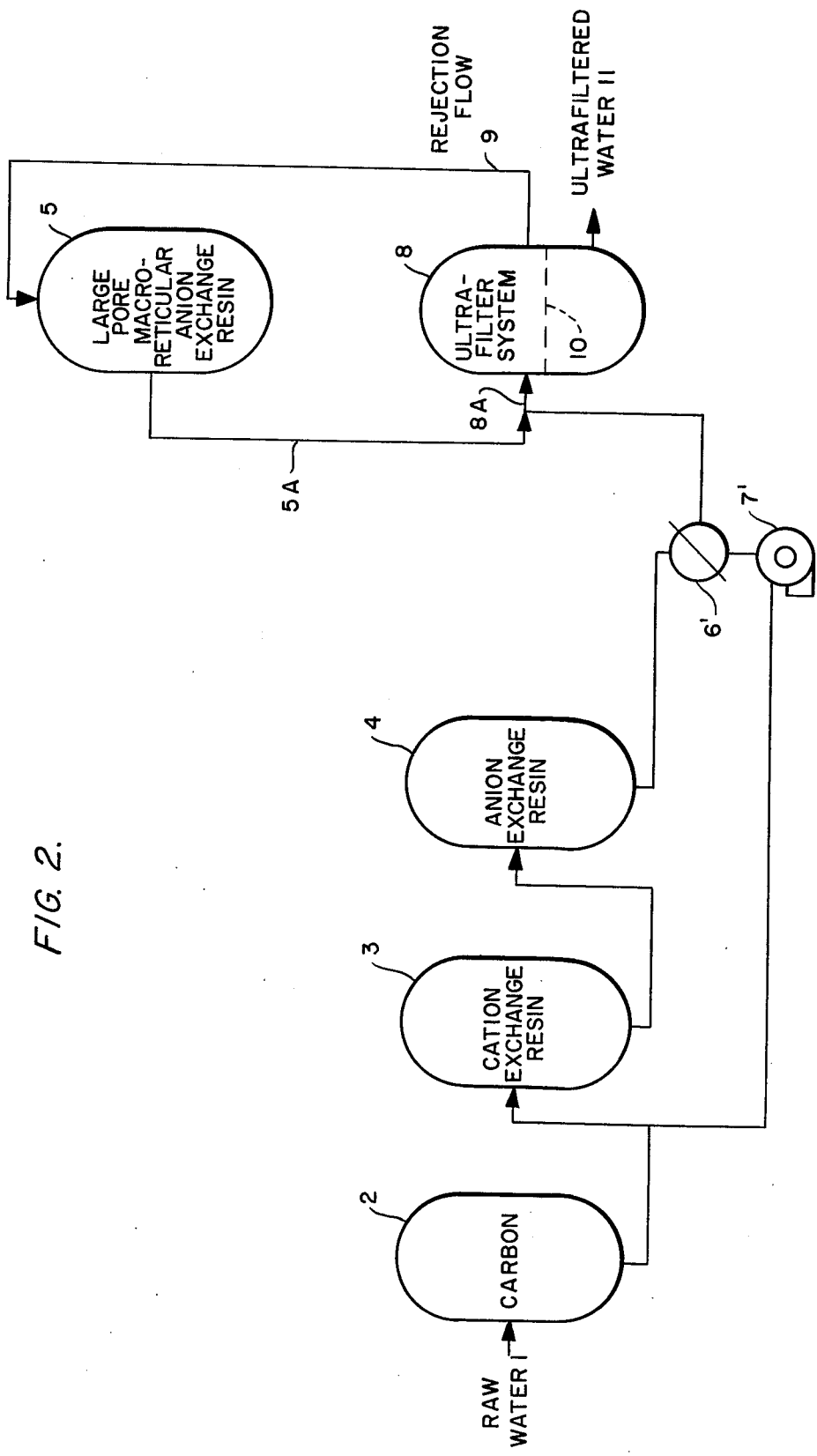
FIG. 2 shows a diagrammatic view of the process of the present invention, large-pore macroreticular anion exchange resin filtration is shown receiving the ultrafiltration rejection flow and returning the flow, post filtration, to the ultrafilter.

A general application of this process may best be understood with reference to FIG. 2. FIG. 2 is a diagram showing the proposed process whereby large-pore macroreticular anion exchange resin filtration of the total flow entering the ultrafiltration apparatus is eliminated. Raw water 1 enters a carbon filtration column 2. This effluent then enters a cation exchange resin column 3 and this effluent then enters an anion exchange resin column 4. At this juncture valve 6' and pump 7' permit recycling of the highly purified water through cation 3 and anion 4 exchange resin columns or the water may become the affluent 8A for ultrafiltration 8. The affluent 8A containing bacteria, viri, pyrogens, and colloids then flows under pressure along the ultrafiltration membrane 10 and that portion of the flow which traverses the membrane comprises the ultrafiltered water flow 11. That portion of flow not passing through the ultrafiltration membrane and containing both highly purified water and bacteria, viri, pyrogens and colloids is the rejection flow 9. This rejection flow 9 is then passed through a large-pore macroreticular anion exchange resin column 5 which substantially removes the bacteria, viri, pyrogens, and colloids of the rejection flow. Said rejection flow 9 is characterized by being substantially lower in volume with a higher concentration of bacteria, viri, pyrogens, and colloids than the ultrafiltration affluent 8A. The effluent from the large-pore macroreticular anion exchange resin filtration 5A is reintroduced into the ultrafiltration affluent 8A. For a detailed aspect of this process, FIG. 3 is of assistance.

Figure 3:
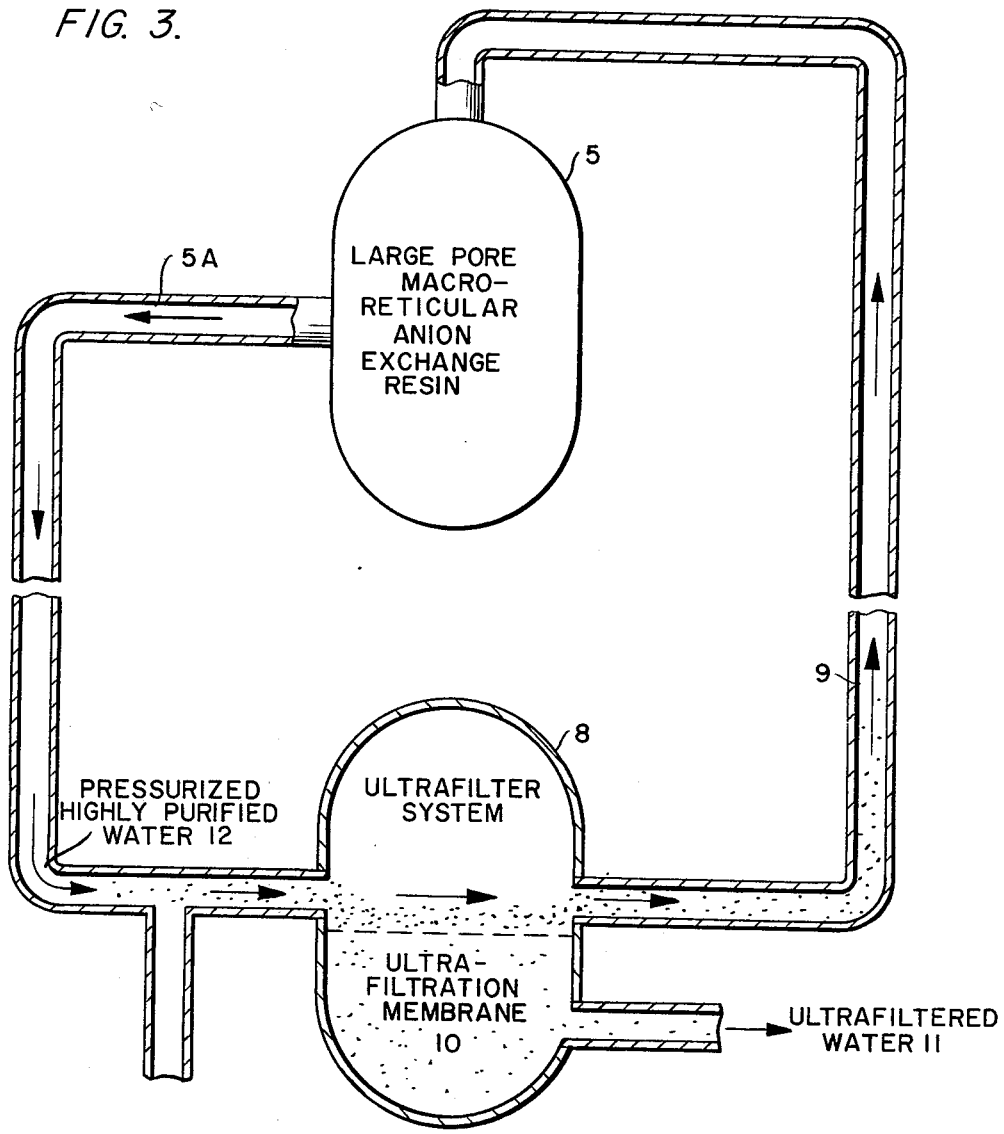
FIG. 3 is a diagrammatic view in section of a portion of the process of FIG. 2 detailing the concentration of contaminants entering the ultrafiltration rejection flow; and, FIG. 4 is a diagrammatic view illustrating an example of the process conducted in accordance with the present invention.

FIG. 3 shows a diagrammatic view in section of the ultrafiltration rejection flow and large-pore macroreticular anion exchange resin loop. The ultrafiltration affluent 12 enters the apparatus and flows along the ultrafiltration membrane 10 under pressure. Much of the water traverses the ultrafiltration membrane 10 and becomes the ultrafiltered effluent 11. The water that does not traverse the ultrafiltration membrane, along with increasingly concentrated amounts of bacteria, viri, pyrogens, and colloids becomes the rejection flow 9. This rejection flow 9 is then passed over a column of large-pore macroreticular anion exchange resin 5 and the effluent of this column now substantially free from bacteria, viri, pyrogens, and colloids is reintroduced into the ultrafiltration affluent 12 via stream 5A.

It is important to emphasize that the highly purified water flows along the ultrafiltration membrane as a pressurized flow. Due to the high purity of this affluent flow, a system may be run under conditions of flow and pressure to cause about 95% of the affluent water to pass through the membrane and about 5% of the affluent not traversing the membrane to become the rejection flow. This rejection flow contains the bulk of the remaining impurities along with the 5% highly purified water. This rejection fraction of the water flow and the bacteria, viri, pyrogens, and colloids present (and now concentrated) is not discarded in the present process. The rejection flow is diverted to a large-pore macroreticular anion exchange resin column. A useful large-pore macroreticular anion exchange resin for this purpose is AMBERGARD XE-352, (Rohm & Hass Company, Independence Mall West, Philadelphia, Pa. 19105). AMBERGARD XE-352 is a large-pore macroreticular, Type 1, quaternary ammonium, anion exchange resin which is available in a chloride form and a hydroxide form. AMBERGARD XE-352 in the chloride form will be suitable for most applications. However, when highly deionized water is required, the small amount of chloride leakage experienced with AMBERGARD XE-352 (Cl-) will downgrade 18 megohm water to approximately 2 megohms. This problem may be overcome by using AMBERGARD XE-352 in the hydroxide form, intimately mixed with a strongly acidic resin such as AMBERLITE ® IR-120 in a volume ratio of 3.9 to 1.0. A mixed bed of AMBERGARD XE-352 has been found to be equally effective in removing bacteria as the resin in the Cl- form. Moreover, the quality of the effluent water is 18 megohms or better.

The resin may be converted into the OH- form by washing with 15 lbs. $NaOH/ft.^3$(240 g NaOH/L) (4% solution) at a flow rate of 0.25 $gpm/ft.^3$ (2.0 L/L/hr.) and a temperature of 120° F. (49° C.). The large pore size of the resin bead, approximately 7 microns (70,000 A), allows microorganisms to enter the pore cavity and be electrostatically bound to the surface of the cavity. Due to their large size, pores can easily accommodate bacteria, but will still accept smaller particles such as pyrogens or viruses.

Because of their very high porosity, the AMBERGARD filters can be visualized as small (approximately 0.5 mm diameter) sponges. A packed column in effect contains millions of these sponges, each functioning as a filter for submicron matter. The hydraulics of the system are determined by the bead size and not by the porosity within each particle; this allows a packed column to be operated at relatively higher flow rates without experiencing noticeable pressure drops, provided silt, sediment and other colloidal matter are not present in significant quantities.

Because the Ambergard filters operate on this aforementioned principle they do not suffer from the "clogging" experienced with conventional submicron membrane filtration which necessitates replacement of the membrane on a frequent basis.

The filtration column, when AMBERGARD XE-352 is the large-pore macroreticular anion resin, is run at less than 170° F. in the chloride form and less than 140° F. in the hydroxide form. pH should be between 5 and 9 and at a suggested bed depth of 30 inches for approximately 99.999% bacterial removal. A surface flow rate of up to 10 $gpm/ft^3$ may be used although with the manufacturer's suggested rate of 3 to 7 $gpm/ft^3$ has been found effective. A service linear flow rate of up to 30 $gpm/ft^3$ is also effective. When using AMBERGARD XE-352 as the large-pore macroreticular anion exchange resin, the manufacturer's suggested methods for use of AMBERGARD XE-352 is followed.

The effluent water of filtration through the AMBERGARD XE-352 column is now substantially free from bacteria, pyrogens, and colloid contaminants. The effluent water is then reintroduced into the affluent that will flow along the ultrafiltration membrane.

This affluent is then seen to be only briefly bearing those contaminants that may upon accumulation form a film that will inhibit water transport across the ultrafiltration membrane.

When exhausted, the AMBERGARD filters may be regenerated with 10% HCl or 0.5% NaOCl. HCl treatment is recommended for industrial applications in which economics dictate a long resin lifetime. Under conditions in which the resin bed is inadvertently contaminated, or where the resin lifetime is not critical, NaCl may suffice. It should be noted, however, that repeated or prolonged use of NaOCl, or other oxidizing agents, will decrosslink the resin and reduce its lifetime.

The resin should be regenerated by washing with 3.5 bed volumes of 10 percent HCl (or 0.5% NaOCl) at a flow rate of 0.25 $gpm/ft.^3$ (2.0 L/L/hr.) followed by a downflow water rinse of approximately 10 bed volumes. Experience thus far suggests that approximately 8% resin loss may be experienced during each regeneration cycle. In a typical application as a polishing unit, the AMBERGARD filter bed might last 1-2 months before regeneration is necessary.

Figure 4:
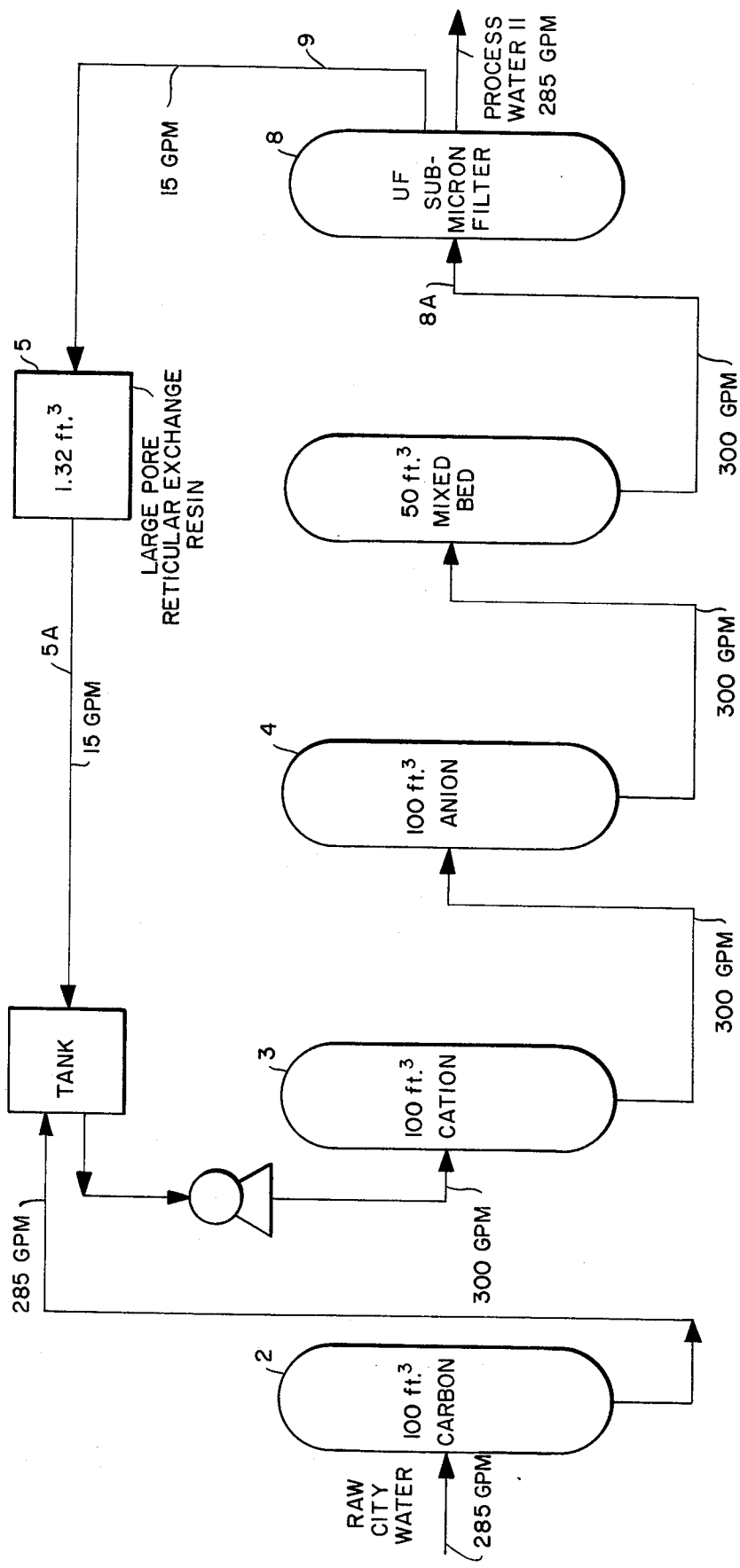

The process of the present invention is further illustrated by the following nonlimiting example, which is taken in conjunction with a diagram of the invention as shown in FIG. 4. All stages are operated at room temperature (20° C.). All stages except the ultrafilter are run at atmospheric pressure, i.e., 760 mm of mercury. In this example, raw water from a typical source such as a city tap is introduced into a conventional carbon filter. The carbon in the filter vessel has a volume of approximatey 100 cubic feet. Raw water is introduced into the carbon filter at the rate of about 285 gallons per minute. The effluent from the carbon filter is delivered to a holding tank and is introduced by a pump into a cation exchange resin bed. The volume of the cation exchange bed is about 100 cubic feet and contains IR-120 Ambertite by Rohm and Haas or Dowex HCR by Dow. The water from the tank is delivered to the cation exchange bed at a rate of about 300 gallons per minute. Water entering the carbon filter contains organics, chlorine, cations, anions, bacteria, colloids, spores, and pyrogens. The carbon filter removes organics and chlorine. Thus, the water entering the cation exchange resin bed contains cations, anions, bacteria, colloids, spores, and pyrogens. The effluent from the cation exchange resin is delivered to an anion exchange resin where anions are removed. The flow rate to the anion exchange resin is 300 gallons per minute and the volume of the bed is 100 cubic feet and contains Ambertite IRA-400 by Rohm and Haas or Dowex SBR by Dow. The effluent from the anion exchange resin is substantially free of both cations and anions but contains bacteria, colloids, spores, and pyrogens. The effluent from the anion exchange resin is then delivered to a mixed bed at the rate of 300 gallons per minute. The mixed bed has a volume of 50 cubic feet and contains Dowex HCR and Dowex SBR-P both by Dow in equal volumes. The mixed bed removes organics, cations and anions that were not removed by the three preceeding stages. The effluent from the mixed bed which contains small amounts of bacteria, colloids, spores, and pyrogens is then delivered to an ultrafilter under a pressure of 5-25 lbs. per sq. in. The ultrafilter is a Romicon GM80 hollow filter cartridge by Rohm and Haas. It has a membrane area of 53 sq. ft., is 43 inches long×three inches wide with a hold up volume of 0.2 galls. Effluent from the mix bed is delivered to this ultrafilter at a rate of about 300 gallons per minute. About 285 gallons per minute of ultrafiltered water is delivered from the ultrafilter. The purity of the final water is 18 megohm-cm and is essentially sterile. About 15 gallons per minute of water which has not passed through the submicron filter is then delivered to a large-pore macroreticular anion exchange resin. About 1.32ft$^3$ of AMBERGARD XE-352 is used. After passing through this large-pore macroreticular anion exchange resin, the 15 gallons per minute of filtered water are delivered to the tank to supplement the water from the carbon filter entering the cation exchange resin.

Thus, from the foregoing it should be apparent that the broad concept of the invention is that of delivering the rejection flow of an ultrafilter system to a filter for removal of those contaminants that have not passed through the ultrafilter and then introducing such filtered water back into the water purification system.

The invention may be embodied in other specffic forms without departing from the spirit or essential characteristics thereof. The present embodiment and example is therefore to be considered in all respects as illustrated and not restrictive, the scope of the invention being indicated by the appended claims rather than by the foregoing description, and all changes which come within the meaning and range of equivalency of the claims are therefore intended to be embraced therein.

I claim:
1. A process for the purification of water comprising:
 (a) providing a flow of raw water to be purified;
 (b) pretreating said raw water flow for partial purification;
 (c) introducing the flow of raw water exiting the pretreatment in (b) into an ultrafilter to produce a flow of purified water and a rejection flow exiting the ultrafilter;
 (d) passing only said rejection flow through a large-pore macroreticular anion exchange resin to remove contaminants from said reject flow;
 (e) combining the rejection flow from step (d) with the raw water introduced into the ultrafilter in step (c) to form a circulating loop.

2. The process of claim 1 wherein sufficient pressure is applied to the combined flow formed in (e) to cause about 95% of the combined volume to pass through the ultrafilter to become the purified water.

3. The process of claim 1 wherein said raw water is passed through a series of pretreatments, inclusive of carbon filtration, prior to being combined with the rejection flow in step (e).

4. The process as set forth in claim 3 wherein said pretreatments include carbon filtration, followed by cation exchange, followed by anion exchange.

5. The process as set forth in claim 1 wherein the water delivered from said large-pore macroreticular anion exchange resin is mixed with said raw water and is pretreated with said raw water by carbon filtration followed by ion exchange prior to being introduced into the ultrafilter.

6. The process of claim 1 wherein the pretreatment of (b) is by passing said flow of raw water through a carbon filter.

* * * * *